United States Patent [19]

Iizuka

[11] 4,080,947

[45] Mar. 28, 1978

[54] APPARATUS AND METHOD FOR CONTROLLING IGNITION OF MULTI-CYLINDER INTERNAL COMBUSTION ENGINES WITH A PASSAGEWAY THAT BYPASSES THROTTLE VALVE

[75] Inventor: Haruhiko Iizuka, Yokosuka, Japan

[73] Assignee: Nissan Motor Company, Limited, Japan

[21] Appl. No.: 747,476

[22] Filed: Dec. 6, 1976

[30] Foreign Application Priority Data

Dec. 8, 1975 Japan .................................. 50/146138

[51] Int. Cl.² .............................................. F02D 13/06
[52] U.S. Cl. ............................ 123/198 F; 123/32 EA; 123/124 R
[58] Field of Search .......... 123/198 F, 32 EC, 32 EB, 123/32 EA, 32 EH, 32 EL, 124 R, 119 D

[56] References Cited

U.S. PATENT DOCUMENTS

| 2,771,867 | 11/1956 | Péras ................................. 123/198 F |
| 2,875,742 | 3/1959 | Dolza ............................. 123/198 F X |
| 2,878,798 | 3/1959 | Dolza et al. ................... 123/198 F X |
| 2,918,047 | 12/1959 | Mick ............................... 123/198 F X |
| 3,578,116 | 5/1971 | Nakajima et al. ............ 123/198 F X |
| 3,756,205 | 9/1973 | Frost .................................. 123/32 EA |
| 3,765,394 | 10/1973 | Francis ............................. 123/198 F |
| 3,866,584 | 2/1975 | Bigalke et al. .............. 123/32 EL X |

Primary Examiner—Charles J. Myhre
Assistant Examiner—Ira S. Lazarus
Attorney, Agent, or Firm—Robert E. Burns; Emmanuel J. Lobato; Bruce L. Adams

[57] ABSTRACT

Apparatus is disclosed in which the supply of air-fuel mixture to one or more of the cylinders of a multi-cylinder internal combustion engine is cut off depending upon the varying engine load conditions to provide fuel economy and passageway is provided to allow portion of the intake air to bypass the throttle valve under light load conditions to compensate for a loss of power due to the cut-off of fuel supply.

10 Claims, 5 Drawing Figures

APPARATUS AND METHOD FOR CONTROLLING IGNITION OF MULTI-CYLINDER INTERNAL COMBUSTION ENGINES WITH A PASSAGEWAY THAT BYPASSES THROTTLE VALVE

BACKGROUND OF THE INVENTION

The present invention relates to apparatus and method for controlling the supply of fuel of the cylinders of a multi-cylinder internal combustion engine by successively inactivating the combustion of one or more of the cylinders in response to sensed engine operating parameter.

It is known in the art to reduce the number of active or ignited cylinders in which combustion takes place when the depression in the intake manifold increases in terms of vacuum in order to reduce fuel consumption under light load conditions. However, under the light load conditions the increased depression in the intake manifold results in a deficient supply of air or a mixture of air and fuel to the reduced number of ignited cylinders and less power is available than is required to supply enough power. This is particularly disadvantageous when the engine is idled since the loss of power would case instability of the engine revolution and the driver has to depress the accelerator pedal to supply additional air or air-fuel mixture to the engine in order to compensate for the loss of power even when the vehicle is at rest. Therefore, it has been difficult to reduce the number of ignited cylinders under the idling conditions without the loss of power to thereby achieve fuel economy.

SUMMARY OF THE INVENTION

The primary object of the invention is therefore to provide ignition control apparatus and method for multi-cylinder internal combustion engines in which the fuel supply for part of cylinders is progressively cut off in response to a sensed engine load without loss of power under light load conditions.

Another object of the invention is to provide a bypass passageway to allow portion of the air in the intake passage to bypass the throttle valve in response to the varying number of cut-off cylinders.

A further object of the invention is to provide apparatus and method for the control of air-fuel supply in which the number of active cylinders and the amount of bypassed air or air-fuel mixture are maintained constant when the intake manifold pressure lies within a predetermined range to provide fuel economy.

In accordance with a broader aspect of the invention, there is provided apparatus for controlling the ignition of the cylinders of a multi-cylinder internal combustion engine mounted on a roadway vehicle having an intake air passage, a throttle valve therein, means for supplying a mixture of air and fuel to each cylinder, and means for igniting the mixture supplied to each cylinder for combustion therein, wherein the apparatus comprises means or sensing an operating parameter of the engine indicative of the magnitude of a load exerted on the engine, means for progressively varying the number of active cylinders to which the mixture is supplied in response to the sensed engine operating parameter, means defining a passageway to the intake air passage to allow a portion of the intake air to bypass the throttle valve, and means for controlling the amount of the air passing through the passageway in response to the decrease or increase in the number of the active cylinders.

In accordance with a narrow aspect of the invention, there is provided apparatus for controlling the injection of fuel to the cylinders of a multi-cylinder, electronically fuel injected internal combustion engine mounted on a roadway vehicle having an air intake passage, a throttle valve therein, means for injecting fuel to each cylinder, and means for generating injection pulses for application to the injection unit of each cylinder, wherein the apparatus comprises means for sensing an operating parameter of the engine indicative of the amount of load exerted on the engine, means for progressively varying the number of active cylinders in which combustion takes place such that the number of the active cylinders decreases one at a time in response to the sensed operating parameter of the engine when the engine load is below a predetermined value and increases one at a time in response to the sensed engine operating parameter when the engine load is above the predetermined value, means defining a passageway to the intake passage to allow a portion of the intake air to bypass the throttle valve, and means for controlling the amount of the air passing through the passageway in response to the decrease and increase in the number of the active cylinders.

In accordance with a further aspect of the invention, there is provided a method for controlling the combustion of air-fuel mixture in the cylinders of a multi-cylinder internal combustion engine mounted on a roadway vehicle having an air intake passage and a throttle valve therein by successively inactivating the combustion of one or more of the cylinders in response to an engine operating parameter, the method comprising sensing an operating parameter of the engine indicative of the magnitude of a load exerted on the engine, operating the cylinders in one of a plurality of different modes in response to the sensed engine parameter such that for each mode there is a different number of active cylinders in which combustion takes place and inactive cylinders in which combustion is inhibited, successively shifting the mode from one to another such that there is a smaller number of active cylinders than the previous mode when the engine load represents a light load and there is a larger number of active cylinders than the previous mode when the sensed engine load represents a heavy load, and allowing a portion of the air in the intake passage to bypass the throttle valve in response to each of the different modes such that there is a maximum amount of the bypassed air when there is a minimum number of active cylinders.

BRIEF DESCRIPTION OF THE DRAWINGS

The invention will be further described by way of examples with reference to the accompanying drawings, in which.

DESCRIPTION OF THE PREFERRED EMBODIMENTS

Figure 1:
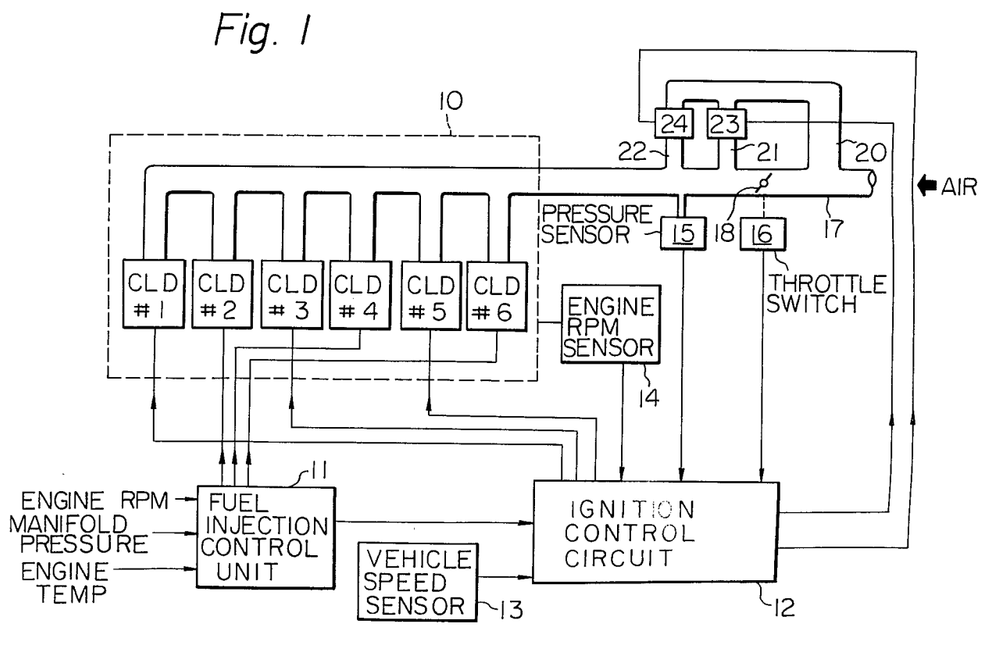
FIG. 1 is a diagrammatical representation of an embodiment of the invention.

Referring now to FIG. 1, an embodiment of the present invention is schematically shown as comprising a six-cylinder, fuel-injection type internal combustion engine 10, a conventional fuel injection control unit 11 which generates injection pulses for application to the injectors of No. 2, No. 4 and No. 6 cylinders of the engine, an ignition control circuit 12 which generates injection pulses for application to the injectors of No. 1, No. 3 and No. 5 cylinders using signals detected by a vehicle speed sensor 13, an engine rpm sensor 14, an intake pressure sensor 15, and a throttle switch 16. A condiut 20 is connected to inlet pipe 17 to allow some amount of intake air to bypass the throttle valve 18. The conduit 20 is bifurcated at its downstream side to form passages 21 and 22 which are provided with control valves 23 and 24, respectively. The control valve 23 is so designed as to control a smaller amount of fluid than that controlled by the other valve 24. By operating control valves 23 and 24, singly or in combination, the amount of air inducted to the downstream side of the throttle valve can be controlled as three discrete amounts by the signal applied thereto.

The fuel injection control unit 11 accepts various information such as engine rpm, intake pressure and engine temperature to generate injection pulses for the cylinders as mentioned above in a manner described in Automotive Electronics Vol. II published by Society of Automotive Engineers, Inc. pages 137 and 138. The ignition control circuit 12 receives injection pulses generated from the control unit 11 and other various information sensed by the vehicle speed sensor 13, engine rpm sensor 14, pressure sensor 15 and throttle position switch 16 to generate output signals including injection pulses for No. 1, No. 3 and No. 5 cylinders and control signals for the valves 23 and 24.

Figure 2:
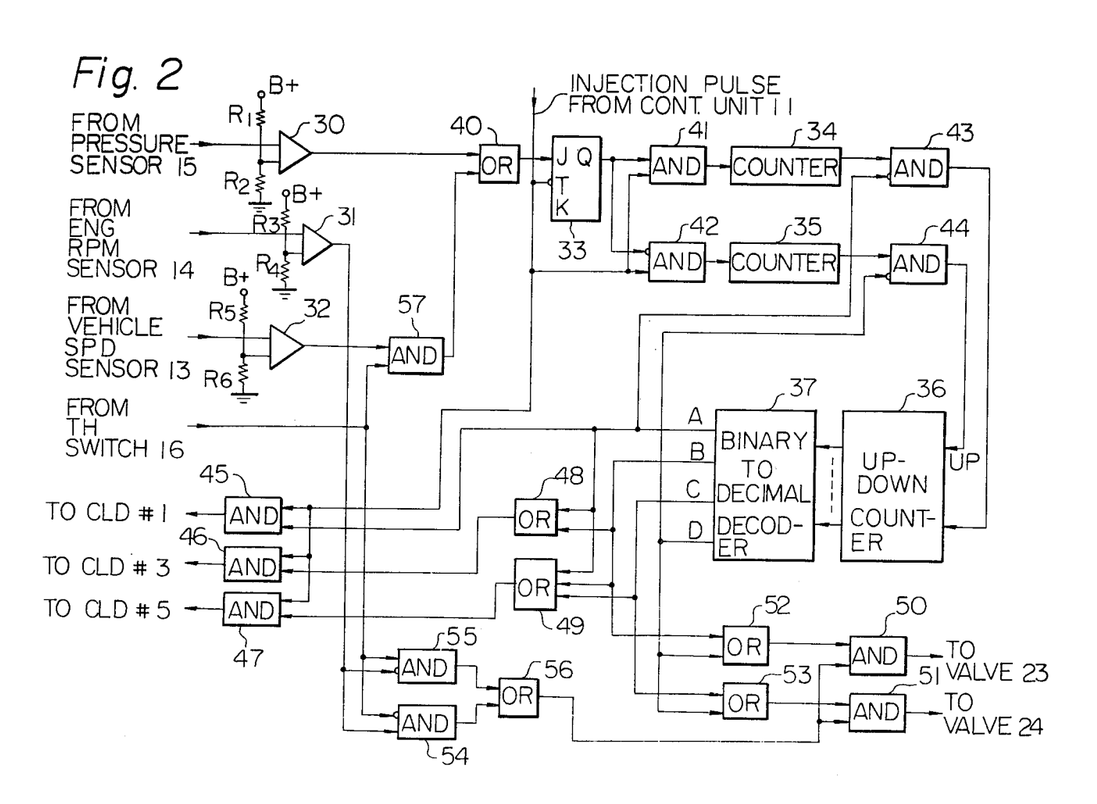
FIG. 2 is a circuit block diagram of an ignition control circuit of the embodiment of FIG. 1.

In FIG. 2, the ignition control circuit 12 comprises operational amplifier comparators 30, 31 and 32, J-K flip-flop 33, counters 34, 35, up-down counter 36, binary-to-decimal decoder 37 and various logic gate circuits. The output from the intake pressure sensor 15 is a first input of the operational amplifier 30 for comparison with a reference threshold level at its second input determined by a voltage divider R1 and R2. The comparator 30 is driven to the high output state when the sensed intake pressure is below the atmospheric pressure level to place a logic "1" to the J input of the flip-flop 33 through an OR gate 40. The flip-flop 33 receives injection pulses from the control unit 11 on its inverted trigger input so that its true or Q output changes to the binary state of the J input at the trailing edge of the injection pulse. The Q output from flip-flop 33 is coupled to a first input of an AND gate 41 whose output is connected to the counter 34 to apply injection pulses thereto when the flip-flop is in the logic state "1," and also to an inhibited AND gate 42 whose output is connected to the counter 35 to apply injection pulses thereto when the flip-flop is in the logic state "0." The output from counter 34 is connected to a first input of AND gate 43 whose output is connected to the down-count terminal of the up-down counter 36, and the output from counter 35 is connected to a first input of AND gate 44 whose output is connected to the up-count terminal of the up-down counter 36. The binary-to-decimal decoder 37 converts the binary represented output from the up-down counter 36 into a decimal output which recyclically activates its output leads A, B, C and D. The lead A is connected to an inhibited input of AND gate 43 to prevent the output from counter 34 from being applied to the down-count terminal of counter 36, and to a first input of AND gate 45, and also to first inputs of AND gates 46 and 47 through OR gates 48 and 49, respectively. The B output lead is connected through OR gates 48 and 49 to the first inputs of AND gates 46 and 47, respectively, and also to a first input of an AND gate 50 through OR gate 52. The C output lead is in turn connected to the first input of AND gate 47 through OR gate 49 and also to a first input of an AND gate 51 through OR gate 53. The D output lead is connected to an inhibited input of AND gate 44 to prevent the output from counter 35 from being applied to the up-count terminal of counter 36, and also to the first inputs of AND gates 50 and 51 through OR gates 52 and 53, respectively. The second inputs of AND gates 45, 46 and 47 are connected together to receive injection pulses from the control unit 11.

The output from the engine rpm sensor 14 is connected to a first input of the operational amplifier comparator 31 for comparison with a reference value at its second input set up by a voltage divider R3 and R4. The comparator 31 is switched to the high output state when the sensed engine rpm is below a predetermined value represented by the reference voltage to enable an AND gate 54 while disabling AND gate 55. The outputs from the AND gates 54 and 55 are connected to the second inputs of AND gates 50 and 51 through an OR gate 56.

The output from the vehicle speed sensor 13 is connected to a first input of the operational amplifier comparator 32 for comparison with a reference voltage at its second input determined by a voltage divider R5 and R6. The comparator 32 provides a logic "1" signal to a first input of an AND gate 57 when the vehicle speed is below 30 kilometers per hour, for example. The output from the throttle switch 16 is connected to the second input of the AND gate 57 to enable it except when the throttle valve 18 is substantially at the fully closed position, and also to the second inputs of AND gates 54 and 55. The output of AND gate 57 is connected to the J input of flip-flop 33 through OR gate 40.

Figure 4:
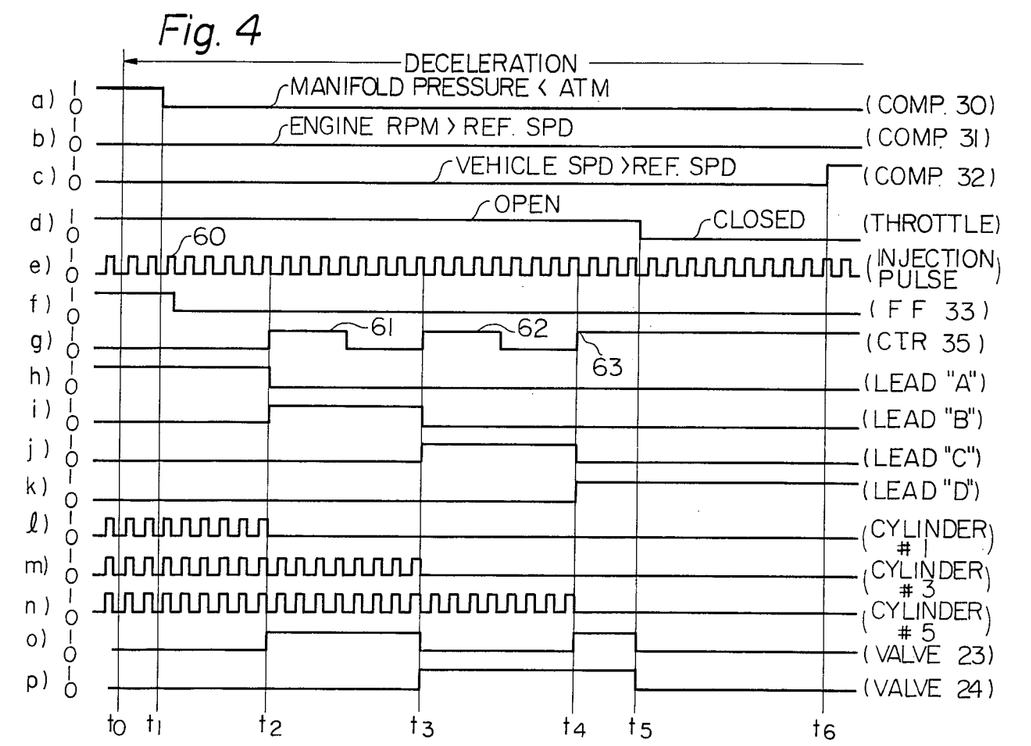
FIGS. 4 and 5 are a series of waveforms useful for describing the operation of the circuits of FIGS. 1 and 2.
Figure 5:
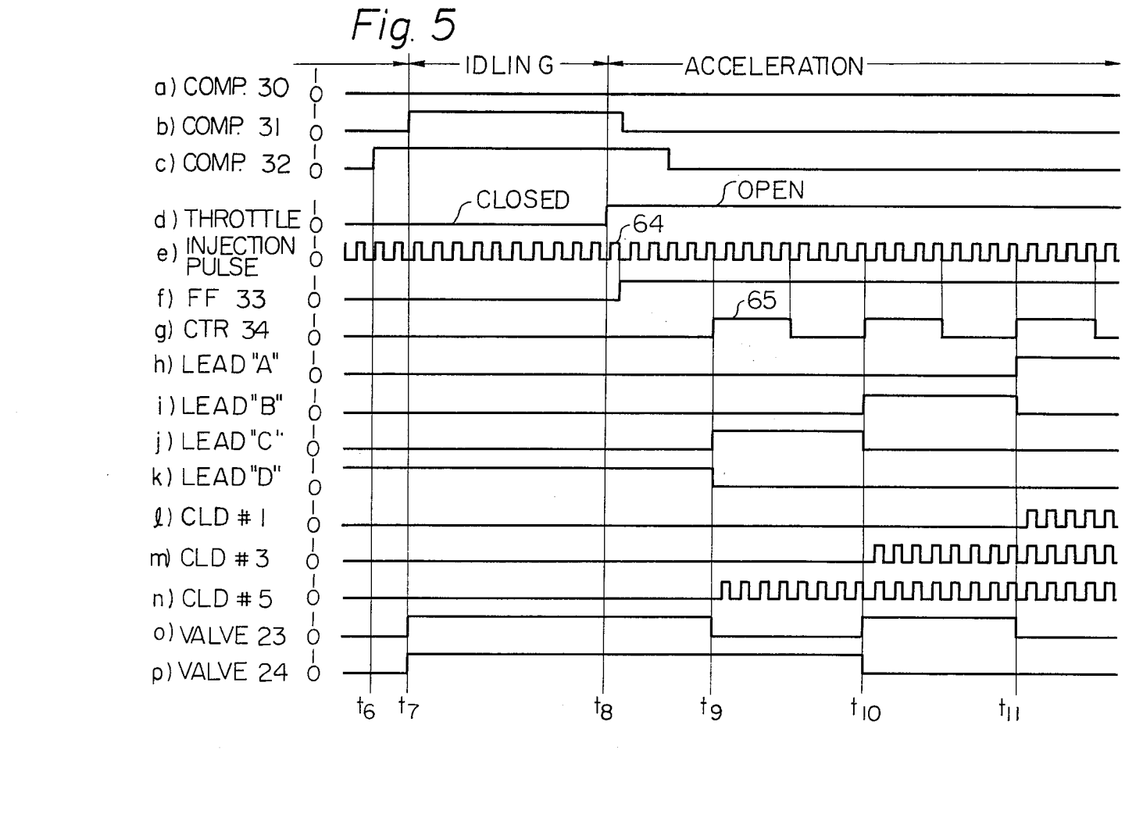

The operation of the embodiment of FIGS. 1 and 2 will best be understood with reference to the waveforms shown in FIGS. 4 and 5. It is assumed that the vehicle is driven at a constant speed of 60 kilometers per hour, for example, and brake is applied at time $t=t_0$. The intake manifold pressure is assumed to have lowered to a level below the atmospheric pressure so that comparator 30 generates a low-level output at time $t=t_1$ (FIG. 4a). With the outputs from comparators 30 and 32 being at low level, the J-K flip-flop 33 changes to the low-output state (logic "0") at the trailing edge of an injection pulse 60 (FIG. 4f). This enables AND gate 42 to pass injection pulses to the counter 35. When the counter 35 has counted a predetermined number of input pulses, it provides a pulse 61 at time $t=t_2$ (FIG. 4g) to the up-count terminal of the up-down counter 36 through AND gate 44 which has been enabled by the low-level output on lead D of the binary-to-decimal decoder 37. The output lead A of decoder 37 has been at the high signal level to enable AND gates 45, 46 and 47 to apply injection pulses to the No. 1, No. 3 and No. 5 cylinders (FIG. 4h), while at the same time disabling AND gate 43 until time $t=t_2$. The updown counter 36 has been upcounted by the output from AND gate 44 to shift the output of decoder 37 from lead A to lead B at $t=t_2$, whereupon AND gate 45 is disabled to inhibit the ignition of cylinder No. 1 from then on (FIGS. 4a and 4l). Since AND gate 55 is activated at time $t=t_0$, AND gate 50 is activated at time $t=t_2$ by the output on the lead B of decoder 37 to operate valve 23 to provide a bypass passageway through passages 20 and 21 to allow a small amount of air to bypass the throttle valve 18 (FIG. 4o). These conditions will persist until the counter 35 generates a subsequent pulse 62 at time $t=t_3$ which upcounts the counter 36 to shift the decoder output from output lead B to lead C (FIG. 4j).

The output on lead C activates AND gate 51 to operate valve 24 to switch the conducting passageway from passage 21 to passage 22 so that a greater amount of air is allowed to bypass the throttle valve 18 than that bypassed through passage 21 (FIGS. 4o and 4p), while at the same time disabling AND gates 45 and 46 to inhibit ignition of cylinders No. 1 and No. 3 (FIG. 4l and 4m). These conditions will continue until the counter 35 generates the next pulse 63 which upcounts the counter 36 to shift the decoder output from output lead C to lead D at time $t=t_4$ (FIGS. 4j and 4k). This disables AND gate 47 to inhibit ignition of the cylinder No. 5 (FIG. 4n) and at the same time activates both AND gates 50 and 51 to simultaneously operate valves 23 and 24 so that passages 21 and 22 are open to allow a greater amount of air to bypass the throttle valve 18 than that previously bypassed through the passage 22.

When the throttle valve 18 is substantially closed at time $t=t_5$, a low-level output from the throttle switch 16 deactivates AND gate 55, as a result of which the signals from the AND gates 50 and 51 are no longer present and both control valves 23 and 24 are closed. The simultaneous closure of valves 23 and 24 with the engine running at a speed above the reference value, the engine is allowed to run for utilization of its inertial force as a brake for the vehicle until its speed lowers below the predetermined value at time $t=t_6$.

Therefore, during the time interval $t=t_2$ to $t=t_4$, the number of ignited cylinders is progressively decreased and in step therewith the amount of bypassed air-fuel mixture is progressively increased.

When the engine rpm falls below the predetermined value, comparator 31 generates a high-level output at time $t=t_7$ with the throttle being closed. These conditions can be regarded as the engine being idled. The high-level output from comparator 31 and the low-level output from the throttle switch 16 activate AND gate 54. With the decoder 37 providing its output on lead D, AND gates 50 and 51 are activated to operate valves 23 and 24 (FIGS. 5o and 5p) until time $t=t_8$ when the throttle valve 18 begin to open for acceleration. Therefore, under the idling interval $t=t_7$ to $t=t_8$, both bypass passages are open to supply additional amount of air to the three operating cylinders, i.e., No. 2, No. 4 and No. 6.

The process of operating the remaining cylinders during the acceleration period commencing at time $t=t_8$ is the inverse of the process described in connection with the operation under deceleration. With the high-level output from throttle switch 16, the J-K flip-flop 33 is switched to the high output state at the trailing edge of an injection pulse 64 (FIGS. 5e and 5f). This enables AND gate 41 while disabling AND gate 42 so that the injection pulses are applied to the counter 34 rather than to the counter 35. Upon the count of a predetermined number of injection pulses, the counter 34 provides an output pulse 65 at time $t=t_9$ to the down-count terminal of the counter 36 so that the decoder 37 shifts its output from lead D to lead C, thereby deactivating control valve 23 while valve 24 remains operated. At the same time, AND gate 47 is enabled to pass injection pulses to the No. 5 cylinder. The next down count occurs at time $t=t_{10}$, whereupon the lead B is activated to supply injection pulses to cylinder No. 3 in additon to cylinder No. 5 and to switch the operation of valves from valve 24 to valve 23. A further down count occurs at time $t=t_{11}$, whereupon the lead A is activated to supply injection pulses to cylinder No. 1 as well as to cylinders No. 3 and No. 5 and to deactivate valve 23. Therefore, when the vehicle is being accelerated, the number of cylinders fired increases progressively while the amount of bypassed air decreases progressively in step with the increase of the cylinders fired.

Figure 3:
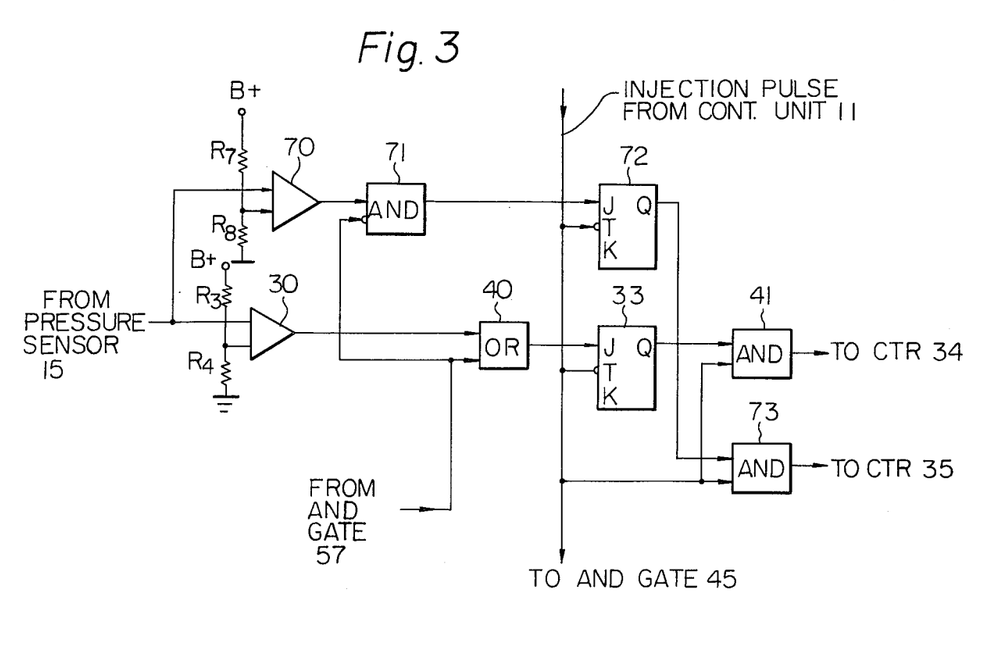
FIG. 3 is a modification of the circuit of FIG. 2.

FIG. 3 illustrates a modification of the embodiment of FIG. 2. In this modification, similar parts to those shown in FIG. 2 are identified with similar numbers. The output from the pressure sensor 15 is connected to a first input of an operational amplifier comparator 70 as well as to the input to the comparator 30. The second input of the comparator 70 is connected to a reference voltage from a voltage divider R7 and R8 which are chosen at such a value that when the intake pressure is lower than −200 mHg, the comparator 70 is driven to the high output state. On the other hand, resistors R3 and R4 are chosen such that the comparator 30 generates a high level output when the intake pressure rises above −100 mHg. The output from the comparator 70 is connected to a first input of an AND gate 71 whose output is connected to the J input of a J-K flip-flop 72 with its true or Q output being connected to a first input of an AND gate 73. The second or inhibit input of the AND gate 71 is connected to the output of AND gate 57. The trigger input of the flip-flop 72 is connected to receive injection pulses from the control unit 11. The second input of AND gate 73 is connected to receive the injection pulse from the control unit 11.

With the arrangements as described above, the AND gate 71 is enabled only when either throttle valve is substantially closed or vehicle speed is higher than the predetermined value represented by the reference voltage set by resistors R5 and R6. With the intake pressure lying below the level of −200 mmHg, AND gate 71 is activated to place a logic "1" on the J input of flip-flop 72 and its output goes high upon the trailing edge of a subsequent injection pulse, so that AND gate 73 is enabled to pass injection pulses to the counter 35 to commence the up-count operation in the up-down counter 36. When the intake pressure rises above the vacuum level of −100 mHg, a logic "1" is placed on the J input of flip-flop 33 and AND gate 41 is enabled to pass injection pulses to counter 34 to commence the down-count operation in the up-down counter 36. With the intake pressure lying within the range from −100 to −200 mHg, a logic "0" is applied to the J inputs of flip-flops 33 and 72 and their outputs switch to the low voltage level to disable AND gates 41 and 73. Therefore, under such condition, injection pulses are prevented from entering the counters 34 and 35 and as a result the number of ignited cylinders and the number of operated control valves remain unchanged. Since the engine 10 runs at the maximum efficiency when the intake pressure lies within the aforementioned range, the interruption of up-down counter 36 has the effect of providing fuel economy.

By the provision of the passageway that bypass the throttle valve, the vehicle driver is free from the attempts to compensate for the loss of power arising from the partial cut-off of air-fuel mixture under light load conditions.

In the foregoing, the invention is described in connection with an internal combustion engine with an electronic fuel injection. However, internal combustion engines with a carburetor having an electromagnetically operated valve that controls the supply of air-fuel mixture may also be employed in the present invention. Therefore, the foregoing description shows only preferred forms of the present invention. Various modifications are apparent to those skilled in the art without departing from the scope of the invention which is only limited by the appended claims.

What is claimed is:

1. Apparatus for controlling the ignition of the cylinders of a multi-cylinder internal combustion engine mounted on a roadway vehicle having an intake air passage, a throttle valve therein, means for supplying a mixture of air and fuel to each cylinder, and means for igniting the mixture supplied to each cylinder for combustion therein, comprising:
    means for sensing an operating parameter of the engine indicative of the magnitude of a load exerted on said engine;
    means for progressively varying the number of active cylinders to which the mixture is supplied in response to the sensed engine operating parameter;
    means defining a passageway to said intake air passage to allow a portion of the intake air to bypass said throttle valve; and p1 means for controlling the amount of the air passing through said passageway in response to the decrease or increase in the number of said active cylinders.

2. Apparatus as claimed in claim 1, wherein said engine parameter sensing means comprises:
    first means for sensing the speed of the vehicle;
    second means for sensing the pressure in said intake passage;
    third means for sensing the speed of said engine; and
    fourth means for sensing the position of said throttle valve.

3. Apparatus as claimed in claim 2, wherein said means for progressively varying the number of active cylinders comprises means responsive to one or more of said first, second, third and fourth sensing means to detect when the engine is under light load or heavy load, means responsive to the detected light load for decreasing the number of active cylinders one at a time, and means responsive to the detected heavy load for increasing the number of active cylinders one at a time, and wherein said controlling means comprises means for increasing the amount of air passing through said bypass passageway in step with a decrease in the number of active cylinders and decreasing the amount of said air in step with an increase in the number of active cylinders.

4. Apparatus as claimed in claim 3, wherein said controlling means includes means responsive to the sensed throttle position and to the sensed vehicle speed for blocking said bypass passageway when the throttle valve has substantially closed said intake air passage and the vehicle speed is above a predetermined value.

5. Apparatus as claimed in claim 3, wherein said controlling means includes means responsive to one or more of said first, second, third and fourth sensing means to detect the idling condition of the engine, and means responsive to the detected idling condition for increasing the amount of the air passing through said bypass passageway to a maximum.

6. Apparatus as claimed in claim 3, wherein said means for varying the number of active cylinders comprises:
    means for generating a first signal in response to the detected light load and a second signal in response to the detected heavy load; and
    an up-down counter having up and down count modes of operation and responsive to the first signal to operate in one of the up and down count modes and responsive to the second signal to operate in the other mode.

7. Apparatus as claimed in claim 6, wherein said second sensing means comprises means for detecting when the pressure in the air intake passage lies within a predetermined range, and wherein said means for varying the number of active cylinders includes means for inhibiting said first and second signals when said detected pressure is within said predetermined range.

8. Apparatus for controlling the injection of fuel to the cylinders of a multi-cylinder, electronically fuel injected internal combustion engine mounted on a roadway vehicle having an air intake passage, a throttle valve therein, means for injecting fuel to each cylinder, and means for generating injection pulses for application to the injection unit of each cylinder, comprising:
    means for sensing an operating parameter of the engine indicative of the amount of load exerted on said engine;
    means for progressively varying the number of active cylinders in which combustion takes place such that the number of said active cylinders decreases one at a time in response to the sensed operating parameter of the engine when the engine load is below a predetermined value and increases one at a time in response to the sensed engine operating parameter when the engine load is above said predetermined value;
    means defining a passageway to said air intake passage to allow a portion of the intake air to bypass said throttle valve; and
    means for controlling the amount of the air passing through said passageway in response to the decrease and increase in the number of said active cylinders.

9. A method for controlling the combustion of air-fuel mixture in the cylinders of a multi-cylinder internal combustion engine mounted on a roadway vehicle having an air intake passage and a throttle valve therein by successively inactivating the combustion of one or more of the cylinders in response to an engine operating parameter, comprising the steps of:
    sensing an operating parameter of the engine indicative of the magnitude of a load exerted on said engine;
    operating the cylinders in one of a plurality of different modes in response to the sensed engine parameter such that for each mode there is a different number of active cylinders in which combustion takes place and inactive cylinders in which combustion is inhibited;
    successively shifting the mode from one to another such that there is a smaller number of active cylinders than the previous mode when the engine load represents a light load and there is a larger number of active cylinders than the previous mode when the sensed engine load represents a heavy load; and
    allowing a portion of the air in said intake passage to bypass said throttle valve in response to each of the different modes such that there is a maximum amount of the bypassed air when there is a minimum number of active cylinders.

10. A method as claimed in claim 9, further comprising the steps of:
sensing when the pressure in said intake passage lies within a predetermined range; and
maintaining the cylinders at one of said different modes when the sensed pressure is in said predetermined range.

* * * * *